(12) United States Patent  
Aizu et al.

(10) Patent No.: US 7,729,331 B2  
(45) Date of Patent: Jun. 1, 2010

(54) HOME TERMINAL APPARATUS AND COMMUNICATION SYSTEM

(75) Inventors: Kazuhiro Aizu, Neyagawa (JP); Yasuyuki Shintani, Nishinomiya (JP); Shinichi Tsuchida, Ibaraki (JP); Jiro Matsui, Ichikawa (JP); Tamotsu Yatabe, Kamagaya (JP); Masatoshi Nishira, Sakai (JP); Kiichi Kubo, Osaka (JP); Masanori Murabayashi, Yokohama (JP)

(73) Assignee: Panasonic Corporation, Osaka (JP)

( * ) Notice: Subject to any disclaimer, the term of this patent is extended or adjusted under 35 U.S.C. 154(b) by 1419 days.

(21) Appl. No.: 10/523,695

(22) PCT Filed: Sep. 2, 2003

(86) PCT No.: PCT/JP03/11182

§ 371 (c)(1),  
(2), (4) Date: Feb. 3, 2005

(87) PCT Pub. No.: WO2004/023728

PCT Pub. Date: Mar. 18, 2004

(65) Prior Publication Data

US 2006/0080380 A1      Apr. 13, 2006

(30) Foreign Application Priority Data

Sep. 6, 2002      (JP) .............................. 2002-261590

(51) Int. Cl.  
*H04J 3/16* (2006.01)  
*G06F 15/16* (2006.01)

(52) U.S. Cl. ........................ 370/346; 370/392; 370/401; 370/449; 709/225; 709/245

(58) Field of Classification Search .................. 370/401, 370/485, 352, 353, 486, 392, 389, 346, 449; 709/203, 223–228, 243–245; 713/153, 156; 340/541, 545.2; 379/102.01–102.07; 455/420  
See application file for complete search history.

(56) References Cited

U.S. PATENT DOCUMENTS 6,128,664 A      10/2000     Yanagidate et al.

(Continued)

FOREIGN PATENT DOCUMENTS

JP          8-204704          8/1996

(Continued)

OTHER PUBLICATIONS

Harry Newton, Newton's Dictionary, Feb. 2002, 18$^{th}$ edition, definition of internet terminal, mac address, IP address (internet address), port.*

(Continued)

*Primary Examiner*—Aung S Moe  
*Assistant Examiner*—Habte Mered  
(74) *Attorney, Agent, or Firm*—Wenderoth, Lind & Ponack, L.L.P.

(57) ABSTRACT

An Internet terminal comprising: a communication unit that sends a local packet generated by a packet generation unit and receives a response local packet from a server apparatus; an encryption processing unit that encrypts the local packet to be sent out and decrypts the received response local packet; the packet generation unit that generates the local packet; a polling information storage unit that holds a terminal ID and a password used for identifying the internet terminal; a polling interval adjustment unit that identifies a polling interval at which the local packet is periodically sent to the router; and a control unit that sends control information to a terminal apparatus to be controlled and controls such terminal apparatus accordingly.

24 Claims, 13 Drawing Sheets

U.S. PATENT DOCUMENTS

| | | | |
|---|---|---|---|
| 6,161,123 A | 12/2000 | Renouard et al. | |
| 7,010,002 B2 * | 3/2006 | Chow et al. | 370/485 |
| 2001/0029532 A1 * | 10/2001 | Kato et al. | 709/223 |
| 2002/0094081 A1 | 7/2002 | Medvinsky | |
| 2003/0007622 A1 * | 1/2003 | Kalmanek et al. | 379/219 |
| 2003/0061380 A1 * | 3/2003 | Saito et al. | 709/238 |

FOREIGN PATENT DOCUMENTS

| | | |
|---|---|---|
| JP | 2000-183923 | 6/2000 |
| JP | 2000-341337 | 12/2000 |
| JP | 2001-086160 | 3/2001 |
| JP | 2002-204486 | 7/2002 |
| WO | 97/40610 | 10/1997 |
| WO | 02/25880 | 3/2002 |

OTHER PUBLICATIONS

Sen et al, Internet Draft Midcom-unaware NAT/Firewall Traversal, IETF, Apr. 2002.*

* cited by examiner

| Local network side | | Internet side | |
|---|---|---|---|
| Local address | Port number | Global address | Port number |
| 192.168.0.2 | 5000 | 200.123.4.5 | 6000 |
| 192.168.0.3 | 5000 | 200.123.4.5 | 6080 |
| 192.168.0.4 | 5000 | 200.123.4.5 | 6083 |
| ⋮ | ⋮ | ⋮ | ⋮ |

# HOME TERMINAL APPARATUS AND COMMUNICATION SYSTEM

TECHNICAL FIELD

The present invention relates to a home terminal apparatus for sending and receiving packet data to and from a router connected to an external network, the home terminal apparatus being connected to the router via a home network, and a communication system using the home terminal apparatus.

BACKGROUND ART

Recently, access networks such as ADSL (Asymmetric Digital Subscriber Line), optical fiber network and the like which are broadband capable of handling a large amount of communication data and which are accessible at all times have been widespread at an accelerated rate even among ordinary homes. At the same time, many kinds of home networks for organically connecting home appliances at home with one another are under standardization. Under these circumstances, it is expected that a user of these home appliances will be able to operate them from an outside location by remotely operating his/her mobile terminal which can be connected to the Internet and by transmitting control information to such home appliances via the Internet and a home network.

When a connection is made between external and home networks in a conventional method: (i) a plurality of home internet terminals assigned with local addresses are connected, via a home network, to a router connected to an internet network; (ii) the router is connected to the internet network via an internet service provider (ISP) using a communication line; and (iii) the internet service provider (ISP) assigns a global address to the router.

When an external server apparatus makes a control request to an Internet terminal at home by the use of a global address, the following conventional methods are used: a router is set to perform static IP masquerading (e.g. Japanese Laid-Open Patent Application No. 2000-341337) and an Internet terminal performs polling (e.g. Japanese Laid-Open Patent Application No. 08-204704).

In static IP masquerading, a router, when receiving packet data in which a specific port number is described as a destination port number, converts the destination address into the local address of an internet terminal, and then routes the packet data to the internet terminal, with a global address and local addresses being registered in a conversion table as fixed addresses in advance. Therefore, it is possible in static IP masquerading to commence a session not only from the local side but also from the global side.

In the method in which an Internet terminal performs polling, on the other hand, a router receives, from an internet terminal, a local packet to be sent to a server apparatus, and sends such packet to the server apparatus after converting the sender's address included in the packet into the global address of the router and converting the sender's port number included in the packet into a port number which can be used by the router. When this is done, a set of information including the local address of the internet terminal, the global address of the router, the sender's port number of the Internet terminal, and the sender's port number of the router is to be stored in the conversion table for a specified period of time. Then, when receiving a response global packet that includes the details of a control intended for the Internet terminal from the server apparatus, the router specifies the destination on the local network by converting the destination address and the destination port number included in the response global packet into the local address of the Internet terminal and the destination port number of the internet terminal with reference to the conversion table, and routes the packet to the internet terminal.

FIG. 13 is a sequence diagram showing the flow of packet data to be sent for controlling a terminal apparatus at home in accordance with the conventional polling method.

The communication system is comprised of a server apparatus 1301 for sending a remote control request from a user in an outside location to a terminal apparatus at home, a router 1302 for making a conversion between global and local addresses and routing packet data between external and home networks, and an internet terminal 1303 for controlling a home appliance and the like according to the control request.

The internet terminal 1303 sends a local packet 1304 to the server apparatus 1301 in order to check whether there is any control request or not. When there is a control request from the user of a mobile terminal device, the server apparatus 1301 sends, to the internet terminal 1303, a response global packet 1306 as a response in which control information, the terminal ID of a terminal to be controlled, sender information, destination information such as the global address of the router 1302 are attached. Then, the internet terminal 1303 receives a response local packet 1307 that includes the control request, and a target terminal will be controlled accordingly. Note that a connectionless UDP (User Datagram Protocol) is used as a communication protocol.

In a communication using UDP, the router stores a relationship between local and global addresses for a certain period of time. Therefore, when the router 1302 receives the response global packet 1306 that includes the control information at an interval corresponding to the above period of time, it is possible to send the response local packet 1307 that includes the control request to the internet terminal 1303 by specifying the local address of a terminal to be controlled, with reference to a corresponding relationship table.

SUMMARY OF INVENTION

However, the use of the static IP masquerade method for the router requires an ordinary user to make a technical setting for the router such as assigning fixed port numbers used by the router to terminal apparatuses at home. Moreover, although trust and security is a prerequisite for a deal carried out between a service provider and a user when the remote control of home appliances is carried out, since a specific port number should be disclosed on an internet network, there are potential risks associated with security (e.g. home appliance is misoperated) due to a malicious third person who accesses and tampers remote control information, for example.

Meanwhile, when a local packet is sent from an internet terminal to a server apparatus using a simple polling method, the immediacy of an operation request to control a home appliance is lost because of the fact that there is a polling interval. To be more specific, as shown in FIG. 13, since a corresponding relationship between local and global addresses stored in the router 1302 disappears after a certain period of time for reasons concerning security and the memory capacity of the router, the router 1302 cannot make a conversion between such local and global addresses and therefore cannot send the control request if the server apparatus 1301 sends a control request packet 1308 after the above corresponding relationship disappeared. This necessitates the router 1302 to wait for an acknowledgement request from the internet terminal 1303, causing a problem that it takes a certain period of time for a request to reach a home appliance from a mobile terminal device. A worst-case scenario is that the control information disappears in the middle of a polling interval. Also, the polling method has another problem that an internet terminal fails to receive a response global packet depending on the type of a router or an internet connection environment.

Furthermore, under the present circumstances, an internet service provider dynamically assigns a different global address to a router when an always-on connection of ADSL and the like is temporarily broken. For this reason, even when a user tries to access the internet terminal for control information from its mobile terminal device from outside home, a communication cannot be established between them because the server apparatus cannot know a newly assigned global address of the router.

The present invention is intended to solve the above problems whose first object is to provide a home terminal apparatus that enables a control request which a user sends to a home terminal apparatus such as a home appliance and the like from an outside location, to be sent to a terminal apparatus to be controlled without requiring any waiting time, by the use of an existing router.

The second object is to provide a home terminal apparatus that enables the user to remotely control a home terminal apparatus from outside home using its mobile terminal device, soon after purchasing the home terminal apparatus, without needing to make complicated settings to such home terminal apparatus and a router.

The third object is to provide a home terminal apparatus that enables information including control information to be transmitted between a server apparatus, a router, and a home terminal apparatus even in the case where a new global address is dynamically assigned to the router.

The home terminal apparatus according to the present invention is a home terminal apparatus for sending/receiving packet data to and from a router that is connected to an external network to which a server apparatus is connected, the home terminal apparatus being connected to the router via a home network, comprising: a packet generation unit operable to generate packet data to be sent to the server apparatus; a judgment unit operable to judge a sending interval at which said packet data is sent; and a communication unit operable to send/receive the packet data to and from the server apparatus via the router, wherein the communication unit sends the packet data periodically and repeatedly to the router according to the sending interval.

Also, in the home terminal apparatus according to the present invention, the router includes: an assignment unit operable to assign a unique local address to the home terminal apparatus; and a holding unit operable to hold a corresponding relationship between a global address assigned to the router and the local address of the home terminal apparatus for a predetermined period of time, and the home terminal apparatus further comprises a detection unit operable to detect said predetermined period of time during which the corresponding relationship is held in the router, wherein the judgment unit judges that the period detected by the detection unit or a period shorter than said period is the sending interval.

Accordingly, even in an environment where the router is connected to an internet network at all times, it is possible for a control request to control an internet terminal such as a home appliance and the like placed inside a house (on the local side) to be sent from a server apparatus (on the global side). This allows a real time remote controlling of the internet terminal by the user.

Moreover, the server apparatus connected to the home terminal apparatus according to the present invention further includes: a terminal information storage unit operable to store the following information included in the packet data received by the second communication unit as a set of terminal information: the terminal ID of the home terminal apparatus; a global address of the router which is a sender's address; and a global port number of the router which is a sender's port number; and an extraction unit operable to extract, from the terminal information storage unit, the global address and the global port number which correspond to the terminal ID, when a control request to control the home terminal apparatus with said terminal ID occurs, wherein the second packet generation unit generates control packet data that includes a control command in accordance with the control request as well as the global address and the global port number extracted by the extraction unit as a destination address and a destination port number, respectively.

Accordingly, even when a different global address is dynamically assigned to the router due to a temporary disconnection of an always-on connection, it is possible for the server apparatus to obtain a newly assigned global address of the router.

Note that not only is it possible for the present invention to be embodied as a home terminal apparatus as described above, but also as a communication system composed of such home terminal apparatus, the router and the server apparatus, and as a communication method that includes, as its steps, the units of the home terminal apparatus. Furthermore, the present invention is also capable of being embodied as a program that causes a computer and the like to execute the above communication method. It should be also understood that such program can be distributed via recording media such as DVDs and CD-ROMs as well as via transmission media such as a communication network.

As described above, in an environment where a router is connected to an internet network at all times, the present invention allows a control request to control an internet terminal such as a home appliance and the like placed inside a house (on the local side) to be sent immediately from a server apparatus (on the global side) even when the polling method is used. Accordingly, it is possible for a user in an outside location to remotely operate the internet terminal inside the house in real time, using a mobile terminal device.

Moreover, since the polling method is used for the router, the user is not required to have any technical knowledge to set the router. Accordingly, by just getting connected to the router, the user who purchased a home terminal apparatus such as "Kurashi (a Japanese word for "home life") Station" can remotely operate home appliances from an outside location using a mobile terminal device. This allows a dramatic improvement in the convenience of such user.

What is more, even when a different global address is dynamically assigned to the router due to a temporary disconnection of an always-on connection, since a global packet is periodically sent from the home terminal apparatus according to the present invention to the server apparatus, and such server apparatus then stores internet terminal information, it is possible for the server apparatus to obtain a newly assigned global address of the router and to send a control request from the mobile terminal device of the user.

For further information about the technical background to this application, Japanese Patent Application No. 2002-261590 filed Sep. 6, 2002, is incorporated herein by reference.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 6 is a reference diagram showing a corresponding relationship table held by the router according to the first embodiment.

DETAILED DESCRIPTION OF THE INVENTION

An explanation is given of a communication system that incorporates an Internet terminal that is a home terminal apparatus according to the present invention, with reference to the figures.

Note that the internet terminal at home according to the present invention utilizes the characteristics of a router when UDP, which is a connectionless protocol, is used as a communication protocol, and therefore there is no need to add a new functionality to a router itself. In a communication using a connectionless UDP protocol, a router holds a corresponding relationship between a local address and a global address only for a certain period of time at the time of sending/receiving packet data. This is because it is unknown whether or not there will be a response from the party on the other end of the communication. In a communication using TCP, on the other hand, a conversion table (to be also referred to as "corresponding relationship table") is generated when a connection is established between parties on the both ends of the communication, and a corresponding relationship between a local address and a global address is deleted when such connection is broken. Thus, the home Internet terminal apparatus according to the present invention utilizes the characteristics of a router in the case of using UDP.

First Embodiment

Figure 1:
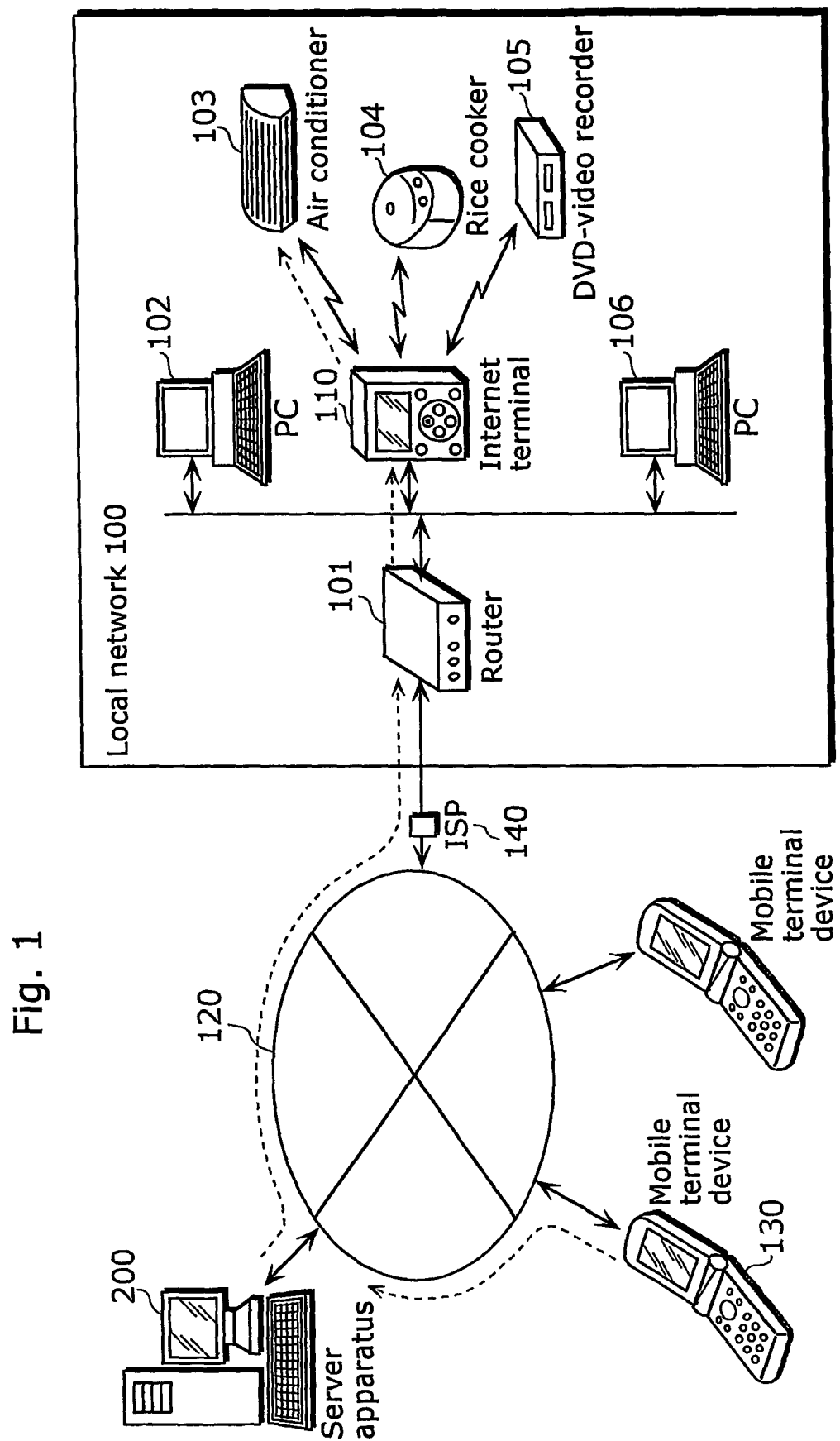
FIG. 1 is a schematic diagram showing an entire configuration of a communication system according to the first embodiment.

FIG. 1 is a schematic diagram showing an entire configuration of a communication system according to the first embodiment. The communication system according to the first embodiment is characterized by that control information from a mobile terminal device 130 in an outside location is transmitted in real time to an internet terminal at home.

Such communication system is composed of a server apparatus 200 dedicated to connecting a mobile terminal and a terminal apparatus on a home network, an internet network 120, a mobile terminal device 130 used by a user for sending and receiving remote control information to and from a terminal apparatus at home, a router 101 for routing packet data in between external and local networks, and an Internet terminal 110, each of which are connected to one another via a cable or wireless communication line. Note that the above networks are on an always-on state using ADSL, optical fiber and the like.

In a local network 100, the router 101 routes incoming and outgoing packet data to and from the house in an integrated manner, and the router 101 and a PC 102 and others inside home are connected to each other via LAN and the like. Also, the router 101 is connected to home appliances such as an air conditioner 103, a rice cooker 104, and a DVD video recorder 105 via radio waves from the internet terminal 110 such as "Kurashi Station", using a communication protocol such as ECHONET.

The router 101 is capable of routing packet data transmitted between the external and home networks, converting an IP address described in an IP header from a global address to a local address, and intentionally destroying packet data that matches a predetermined condition.

Connected to the external network are the mobile terminal device 130 such as a mobile phone by which the user can send control information from an outside location and the server apparatus 200 dedicated to receiving control information sent by the user and sending it to the Internet terminal 110 at home, so as to remotely control a home appliance and the like.

Dotted lines shown in FIG. 1 indicate the flow of remote control information. Control information sent by the user of the mobile terminal device 130 is sent to the dedicated server apparatus 200, which then specifies the global address of the router 101 on the home network, using a user ID, a telephone number, a password and the like. Next, the server apparatus 200 sends, to the terminal apparatus 103 and the like to be controlled, a global packet added with the global address, the terminal ID and others.

More importantly, since the local packet is periodically transmitted from the internet terminal 110 at home in the present invention, it is possible for the router 101 to always hold a table that shows a corresponding relationship between the global address of the router 101 and the local addresses of terminal apparatuses at home in the case where UDP is used as a communication protocol. This allows control information to be sent from the global side to the local side in real time in a communication which handles a UDP packet.

Note that the home appliance 103 and others on the local network 100 are wirelessly connected to the internet terminal 110, but the present invention is not limited to this, and therefore it is also possible that control information can be transmitted with the home appliance 103 and others being connected to the local network directly.

Figure 2:
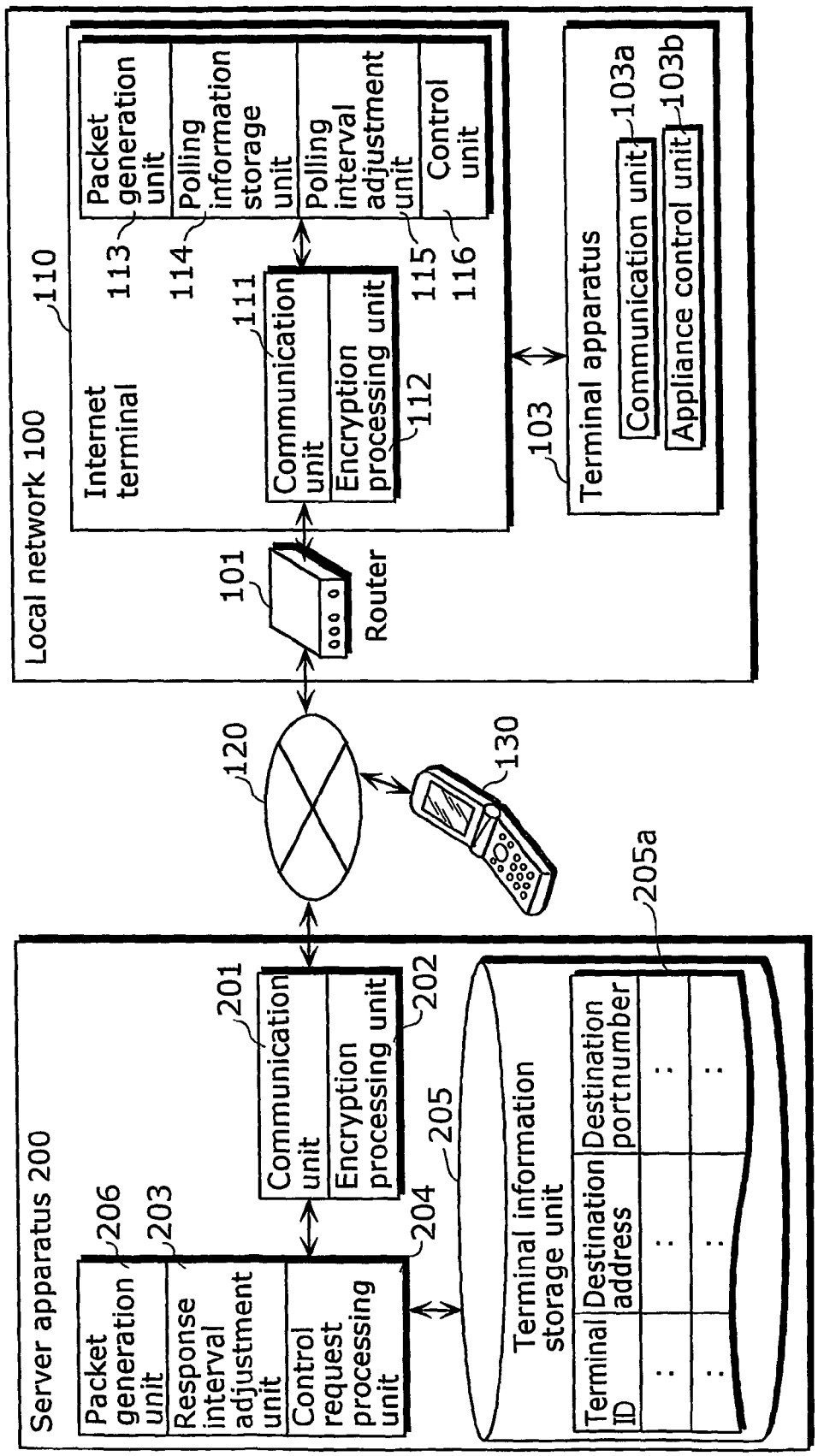
FIG. 2 is a functional block diagram showing a server apparatus, an internet terminal, and a terminal apparatus and the like such as a home appliance connected to the internet terminal.

FIG. 2 is an example functional block diagram showing the server apparatus 200, the internet terminal 110, and the terminal apparatus 103 and the like such as a home appliance connected to the internet terminal 110.

The server apparatus 200 is capable of receiving control information from the mobile terminal device 130, as well as constructing packet data resulted by adding destination address information to the control information and sending it to the target internet terminal 110 on the local network. Such server apparatus 200 is comprised of a communication unit 201, an encryption processing unit 202, a response interval adjustment unit 203, a control request processing unit 204, a terminal information storage unit 205, and a packet generation unit 206.

The communication unit 201 obtains, from the response interval adjustment unit 203, a response interval at which packet data is sent, and sends, to the target internet terminal 110, a response global packet generated by the packet generation unit 206 via the internet network 120, according to such response interval.

The encryption processing unit 202 decrypts the global packet sent by the router 101 and encrypts a response global packet to be sent to the router 101. DES, 3DES, AES or the like is used for this encryption and decryption processing.

The response interval adjustment unit 203 reads out the polling interval included in the global packet sent by the router 101 so as to determine an interval at which a response global packet should be sent, and passes the determined response interval to the communication unit 201.

The terminal information storage unit 205 holds a table 205a in which a set of information including the following information is stored as terminal information: the terminal ID; the sender's address; and the sender's port number included in the received global packet sent by the internet terminal 110.

The packet generation unit 206 generates a response global packet in response to the global packet. More specifically, the packet generation unit 206 specifies the destination address and the destination port number with reference to the table 205a stored by the terminal information storage unit 205 using the terminal ID of a terminal apparatus to be controlled sent by the mobile terminal device 130, and generates a response global packet by adding destination information and sender information to the header part and adding a control request command including the control information to the data part.

The router 101 is a routing device for routing packet data on the external and local networks, and the internet terminal 110 and others inside the house are connected to the external network via the router 101 in an integrated manner.

The router 101 is assigned with a unique global address by the Internet service provider (ISP) 140, and a global packet sent by the router 101 is delivered to a router of such internet service provider. The local packet is then sent to the server apparatus 200 as a destination over the network.

The mobile terminal device 130 is a device for sending and receiving control information used by the user in an outside location to remotely operate the home appliance 103 and others at home. Examples of control information are "start the rice cooker at six" and "record a TV program starting at seven". The mobile terminal device 130 is also capable of receiving information sent by the internet terminal 110 such as one indicating that a recorder is programmed, and one sent from a thermo sensor and a human sensor and the like.

The user of the mobile terminal device 130 specifies the terminal apparatus to be remotely operated and sends control request information by getting connected to the server apparatus 200 dedicated to the remote operation of terminal apparatuses at home.

The Internet terminal 110 is a terminal apparatus capable of managing the home appliance 103 and others at home in an integrated manner, and is connected to the router 101 via LAN and the like. A communication protocol used on the home network is a secure protocol, an example of which is ECHONET. A unique local address is assigned to the internet terminal 110 by the router 101.

The Internet terminal 110 is comprised of a communication unit 111, an encryption processing unit 112, a packet generation unit 113, a polling information storage unit 114, a polling interval adjustment unit 115, and a control unit 116.

The communication unit 111 sends a local packet generated by the packet generation unit 113 and receives a response local packet from server apparatus 200. In the present invention, the communication unit 111 is characterized in that it sends a local packet to the router 101 periodically according to a constant polling interval detected by the polling interval adjustment unit 115.

The encryption processing unit 112 encrypts a local packet to be sent out and decrypts a received response local packet. Note that the encryption processing unit 112 also uses DES and the like for encryption, as in the case of the encryption processing unit 202 of the server apparatus 200.

The packet generation unit 113 generates a local packet including the header part added with address information and port numbers of both the sender and the destination, and of the data part added with data such as a response interval at which a response is made by the server apparatus 200.

The polling information storage unit 114 holds the terminal ID and the password for identifying the internet terminal 110.

The polling interval adjustment unit 115 detects a polling interval at which a local packet shall be periodically sent to the router 101, referring to a holding period during which the router 101 holds the corresponding relationship table, and sends the detected polling interval to the communication unit 111.

The control unit 116 receives, from the router 101, the local packet including a control command specified by the user using the mobile terminal device 130 from an outside location, and performs control processing by sending the control information to a target home appliance such as the rice cooker 104 and others according to the control command included in the local packet.

In FIG. 2, home appliances connected to the internet terminal 110 include the air conditioner 103, the rice cooker 104, and the DVD-video recorder 105, which shall be connected to the internet terminal 110 in the first embodiment. However, these home appliances may also be connected directly to a wireless network, an electric wire, LAN and other networks.

The home appliance 103 and others have a communication unit 103a and an appliance control unit 103b. The communication unit 103a is a processing unit for sending and receiving control information to and from the control unit 116 of the internet terminal 110. The appliance control unit 103b receives a control command from the internet terminal 110 and controls the home appliance 103. An example control command is "start the rice cooker at ten."

Next, an explanation is given of the procedure followed by the user when sending a control request from an outside location via the mobile terminal device 130. First, in the server apparatus 200, the communication unit 201 receives the control request, and the control request processing unit 204 generates a frame 2 by incorporating a command and data used for controlling the home appliance 103 into a control request command 809 in a data part 802, and passes it to the encryption processing unit 202. The encryption processing unit 202 encrypts the frame 2, the packet generation unit 206 generates a response global packet, and the communication unit 201 sends the generated global packet to the router 101.

Next, in the internet terminal 110, the communication unit 111 receives a response local packet, and the encryption processing unit 112 decrypts a data part 802 of the response local packet, and sends the resultant to the control unit 116. The control unit 116 obtains the control request command 809 included in the data part 802 of the response local packet, and sends a control command to the home appliance 103 via the home network, when such control request command 809 is intended for the home appliance 103.

The appliance control unit 103b of the home appliance 103 receives the control command, and controls the home appliance 103 according to the contents of the control command.

Figure 3:
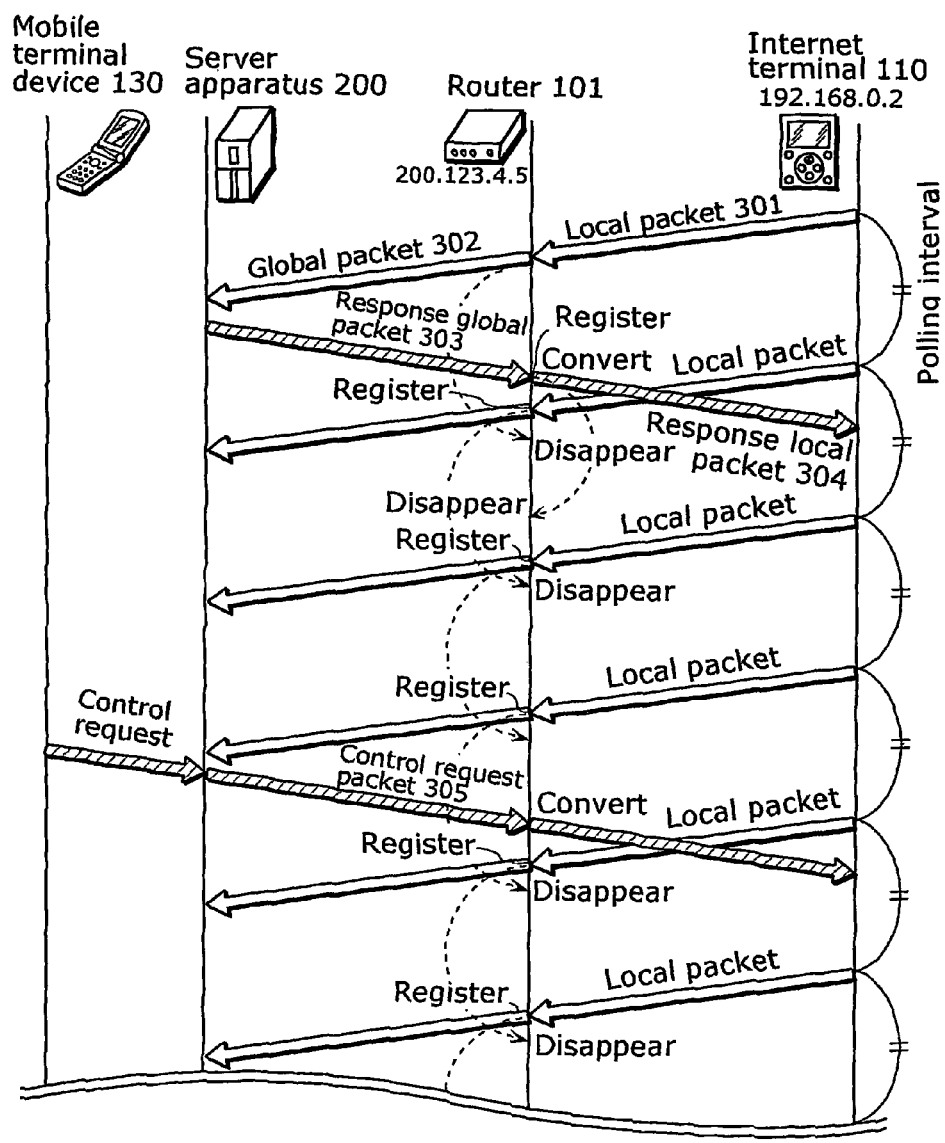
FIG. 3 is a sequence diagram showing the internet terminal according to the first embodiment sending a local packet.

FIG. 3 is a sequence diagram showing packet data being sent and received by the internet terminal 110 according to the first embodiment. Note that in the first embodiment, packet data is referred to differently as a local packet 301, a global packet 302, a response global packet 303 and a response local packet 304, depending on which sending process such packet data is in.

The local packet 301, which is sent from the internet terminal 110 to the router 101, is made up of the header part which includes a destination address, a destination port number, a sender's address, and a sender's port number, and of the data part which includes data. Further, the sender's address includes the local IP address of the internet terminal 110, and the destination address includes the global IP address of the server apparatus 200.

The global packet 302 is sent from the router 101 to the server apparatus 200. The sender's address and the sender's port number included in the global packet 302 are converted by the router 101 into a global address unique to the router 101. The sender's address includes the global IP address of the router 101 and the destination address includes the global IP address of the server apparatus 200.

The response global packet 303 is sent from the server apparatus 200 to the router 101 according to a response interval. The global address and the port number of the router 101 are described as the destination address and the destination port number.

The response local packet 304 is generated by the router 101, which has received the response global packet, by converting the destination address from the global address and the port number of the router 101 into the local address and the port number of the internet terminal 110 with reference to the corresponding relationship table.

The internet terminal 110 is characterized by that it periodically sends a local packet to the router 101 at every polling interval when detecting an interval during which the router 101 holds the table that lists a relationship between local and global addresses.

Under UDP, the router 101 stores a communication status between the global and local sides in the corresponding relationship table for a certain period of time. Usually, a corresponding relationship between the local address and the global address in a local packet sent to the router 101 disappears after a holding period. In the present invention, however, since the Internet terminal 110 sends packet data at every polling interval which is shorter than the holding period, a corresponding relationship between the local and global addresses is always stored in the corresponding relationship table of the router 101. Note that the holding period during which the router 101 holds a corresponding relationship between the local address and the global address is a certain period of time starting from when the router 101 receives the local packet 301 or the response global packet 303 last time (e.g. 3 minutes).

Accordingly, it is possible for the router 101 to always convert, from a global address into a local address, the destination address and the destination port number which are included in the control request packet 305 that includes a control request from the server apparatus 200, as well as to route the resultant to the Internet terminal 110 to be controlled.

Meanwhile, under the present circumstances, in a case where an always-on connection of ADSL, optical fiber and the like is temporarily broken by the user who has turned off the power of the router 101, for example, the internet service provider dynamically assigns a different global address to the router 101 again. Accordingly, there arises a problem that it is impossible to obtain such newly assigned global address of the router 101 even when the user tries to access the internet terminal 110 from the mobile terminal device 130 for control information.

In the present invention, however, since the internet terminal 110 periodically sends, to the server apparatus 200, packet data including the terminal ID, the sender's address, and the sender's port number and the like, it is possible for the terminal information storage unit 205 of the server apparatus 200 which receives such packet data, to store the table 205a listing the latest terminal ID, destination address and destination port number and the like.

Therefore, it is possible for the server apparatus 200 to know the latest global address of the router 101 by checking the terminal ID of the internet terminal 110 to be controlled. This enables control information, which has been sent from the mobile terminal device of the user, to be sent to the internet terminal 110 to be controlled without requiring the user to carry out a special setting task, even when a different global address is assigned to the router 101 due to a temporary disconnection of an always-on connection.

Figure 4:
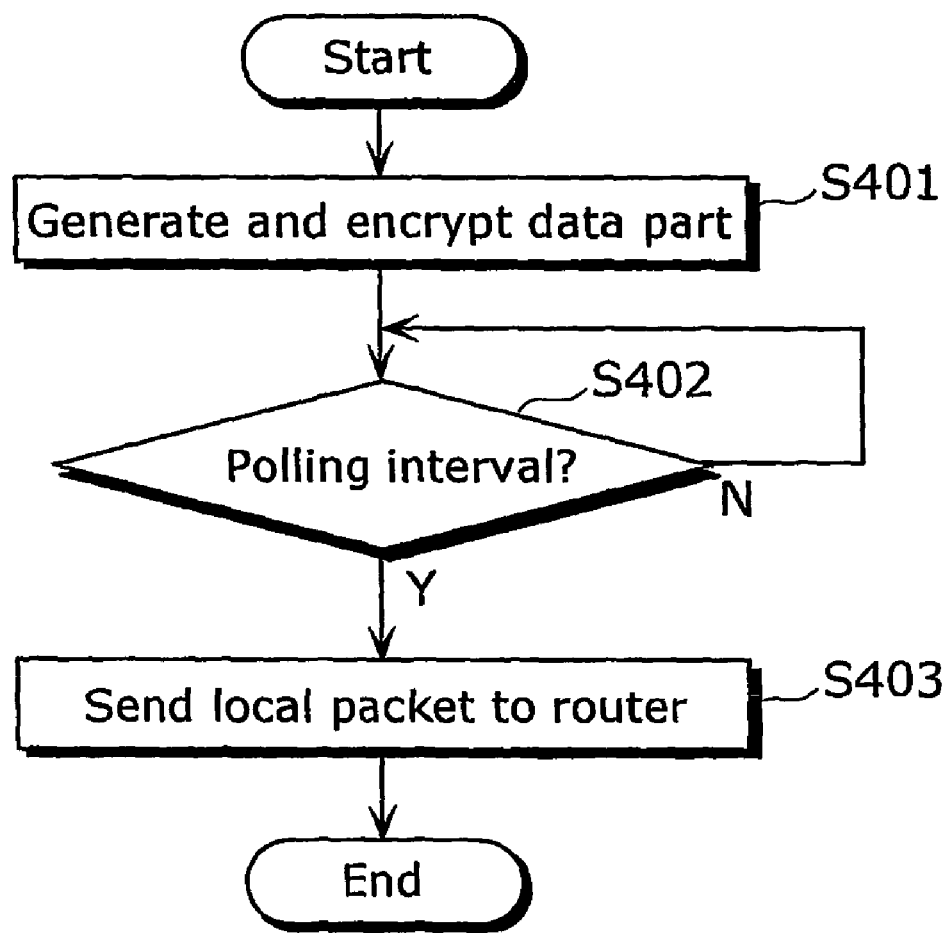
FIG. 4 is a flowchart showing an operating procedure to be followed by the internet terminal according to the first embodiment when sending a local packet to the router periodically.
Figure 5:
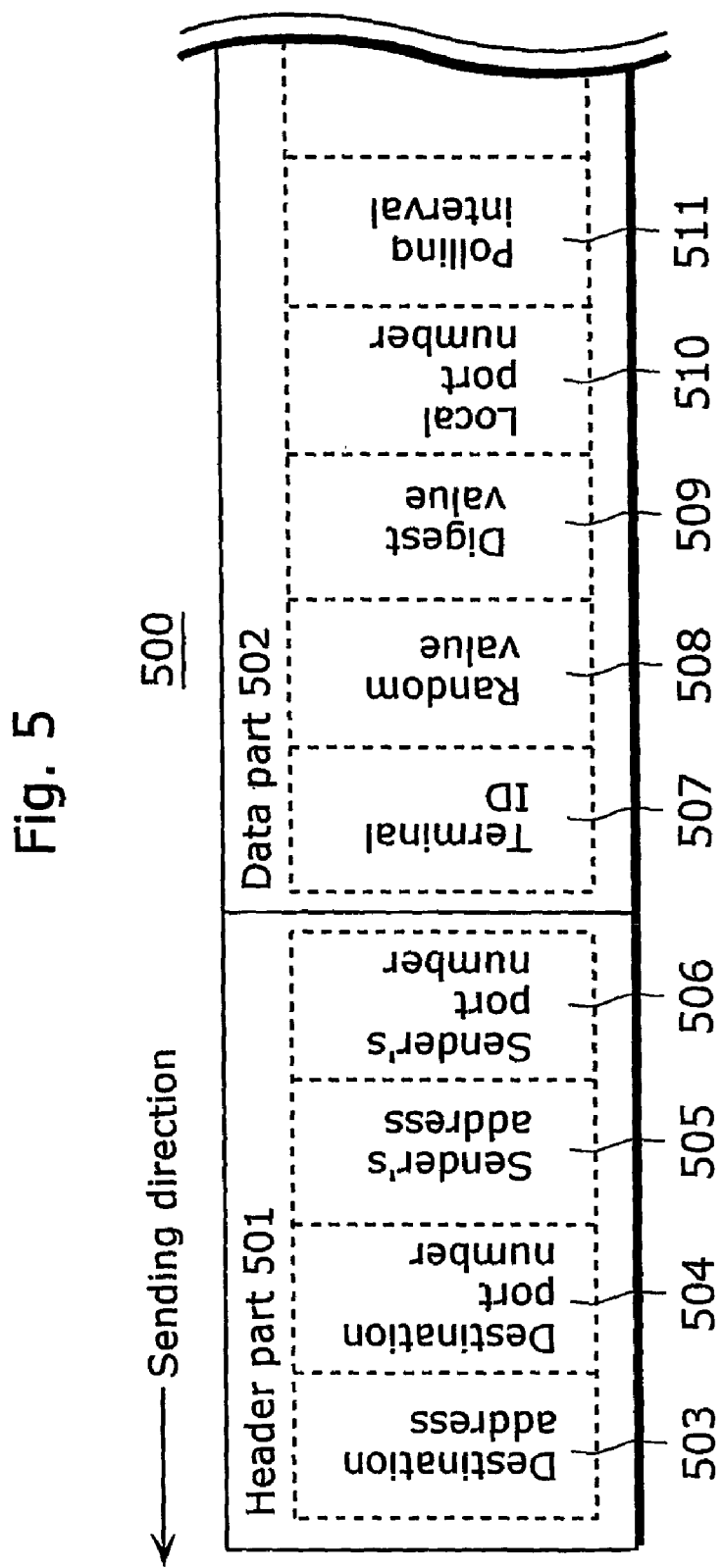
FIG. 5 is a diagram showing an example data structure of a local packet generated by the internet terminal according to the first embodiment.

FIG. 4 is a flowchart showing the operating procedure to be followed by the internet terminal 110 according to the first embodiment when sending a local packet to the router 101 periodically. FIG. 5 is a diagram showing an example data structure of a local packet 500 generated by the internet terminal 110 according to the first embodiment.

The polling information storage unit 114 holds terminal IDs and passwords, and the packet generation unit 113 generates a frame (to be referred to as "frame 1" hereinafter) incorporating a terminal ID and a password obtained from the polling information storage unit 114.

FIG. 5 shows an example of the frame 1 included in the local packet 500. The frame 1, which is information included in the data part 502, includes the following data: a terminal ID 507 for identifying the internet terminal 110; a random value 508 which is a random number; a digest value 509 outputted by inputting the terminal ID 507, a local port number 510, the password, and the random value 508 into a specified function; the local port number 510 which the internet terminal 110 can use; and a polling interval 511 at which the internet terminal 110 sends a local packet periodically. As the above specified function, MD5 which is a hush function can be used, for example.

Next, the encryption processing unit 112 obtains the local packet 500 from the packet generation unit 113 and encrypts the frame 1, and passes the resultant to the communication unit 111 (S401). DES and the like is an example encryption method here. The communication unit 111 adds, to the frame 1 which is the data part 502, a header part 501 that includes a destination address 503, a destination port number 504, a sender's address 505, and a sender's port number 506, and sends the local packet 500 containing the header part 501 and the data part 502 to the router 101.

In the local packet 500, the destination address 503 includes the address of the server apparatus 200, the destination port address 504 includes a port number which the server apparatus 200 can use, the sender's address 505 includes the address of the Internet terminal 110, and the sender's port number 506 includes a port number which is equivalent to the local port number 510, and the data part 502 includes the encrypted frame 1.

The communication unit 111 obtains the polling interval from the polling interval adjustment unit 115, and judges whether the local packet 500 is actually sent at such polling interval or not (S402). When the result of the judgment shows that it is such polling interval (Y in S402), the communication unit 111 sends the local packet 500 to the router 101 (S403), whereas it obtains a polling interval when the result of the judgment shows that it is shorter than such polling interval (N in S402). Note that the Internet terminal 110 performs processing for receiving the response global packet after sending the local packet 500. A detailed explanation of this receiving process is given later.

FIG. 6 is a reference diagram showing a corresponding relationship table 600 held by the router 101 according to the first embodiment. The corresponding relationship table 600 lists, in a paired manner, local addresses and port numbers of the local network side and the global address and port numbers of the external network side.

An explanation is given of conversion processing performed by the router 101 when receiving the local packet 500 from the internet terminal 110 and converting it into a global packet so as to send the resultant to the server apparatus 200. When receiving the local packet 500, the router 101 generates a global packet by converting the sender's address 505 included in the local packet 500 into the global address of the router 101 and by converting the sender's port number 506 included in the local packet 500 into a port number which can be received by the router 101 with the aim of making an efficient use of the global address, and sends the generated global packet to the server apparatus 200.

Moreover, the router 101 stores, in the corresponding relationship table 600, a combination of the local address and the sender's port number of the internet terminal 110 and the global address and the port number of the router 101 as table information.

Figure 7:
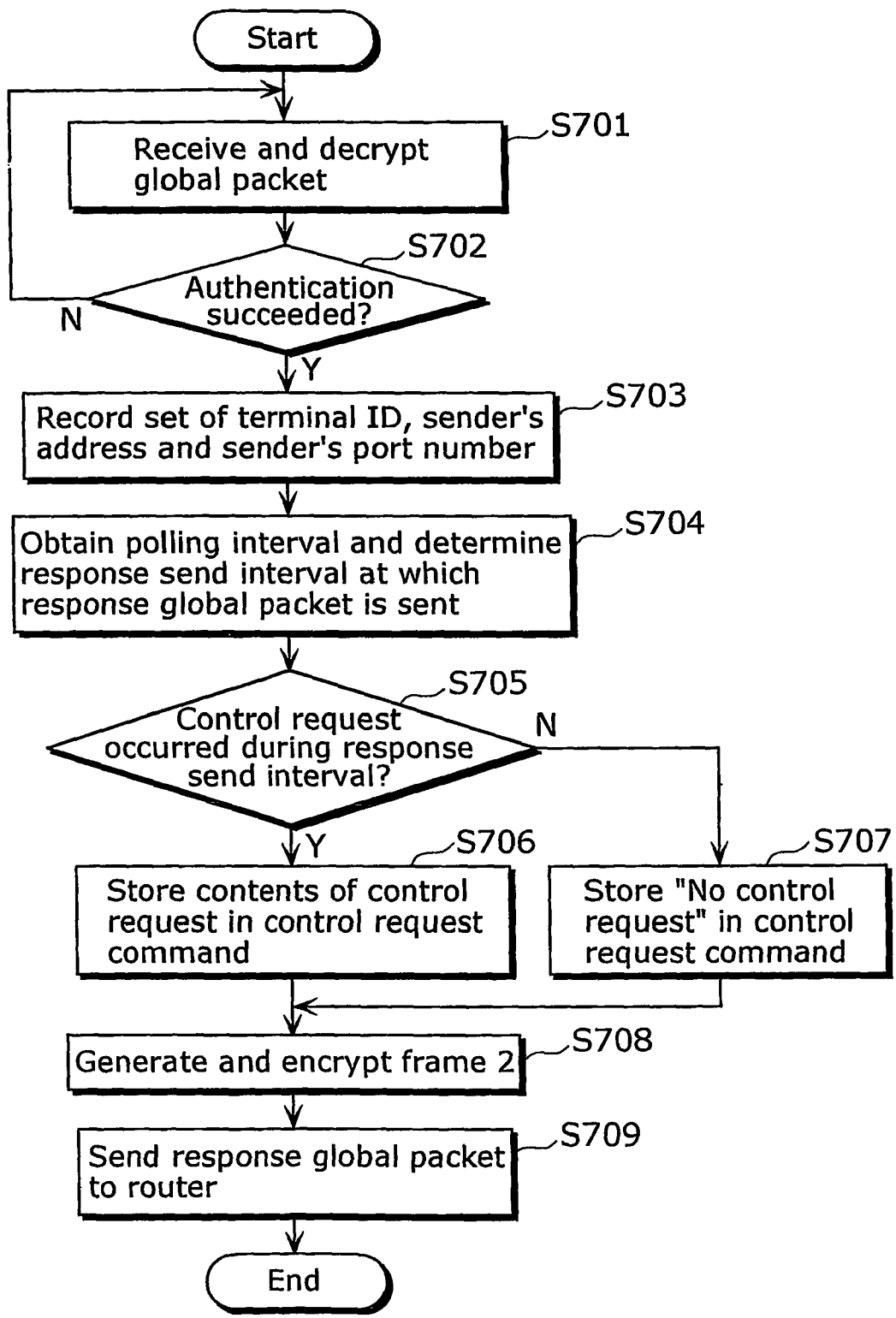
FIG. 7 is a flowchart showing a procedure followed by the server apparatus according to the first embodiment when receiving the global packet from the router and sending back a response global packet to the router.

FIG. 7 is a flowchart showing the procedure followed by the server apparatus 200 according to the first embodiment when receiving the global packet from the router 101 and sending back a response global packet to the router 101.

First, the communication unit 201 of the server apparatus 200 receives the global packet from the router 101, and passes it to the encryption processing unit 202.

Next, the encryption processing unit 202 decrypts the data part 502 included in the global packet, and sends the resultant to the terminal information storage unit 205 (S701). Then, the terminal information storage unit 205 performs authentication on the received global packet. In this authentication processing, the terminal information storage unit 205: (i) obtains the terminal ID 507, the random value 508, the digest value 509, and the local port number 510 included in the data part 502, (ii) searches for a password corresponding to the terminal ID 507, (iii) determines a value by inputting, into a function equivalent to the one used by the packet generation unit 113, the terminal ID 507, the local port number 510, the password, and the random value 508, and (iv) compares the determined value with the digest value 509 (S702).

When the authentication failed (N in S702), the terminal information storage unit 205 destroys the received global packet, whereas when the authentication succeeded (Y in S702), the terminal information storage unit 205 obtains a set information including the terminal ID 507, the sender's address 505, and the sender's port address 506 included in the global packet, and generates and stores the table 205a, with the above obtained set of information as terminal information (S703).

Furthermore, the terminal information storage unit 205 obtains a polling interval 511 included in the global packet, and passes it to the response interval adjustment unit 203. From such polling interval 511, the response interval adjustment unit 203 determines a response send interval which is an interval at which a response global packet, which is a response to the global packet, should be sent back (S704).

Subsequently, the control request processing unit 204 detects whether or not a control request to control the internet terminal 110 has been received from the mobile terminal device 130 during the above determined response send interval after the global packet was received (S705).

When judging that there is a control request (Y in S705), the control request processing unit 204 stores the contents of the control request in a control request command to be incorporated into the response global packet (S706). Meanwhile, when no control request occurs during the response send interval (N in S705), the control request processing unit 204 stores, in the control request command, data indicating that there is no control request (S707), generates a frame (to be referred to as "frame 2" hereinafter) to be incorporated into the response global packet, and passes it to the encryption processing unit 202. Note that, since it is not necessary for the server apparatus 200 to send, to the internet terminal 110, information indicating that there is no control request when the user of the mobile terminal device 130 makes no control request to control a home appliance, S707 may be skipped and a response global packet may be sent back only when a control request is sent from the mobile terminal device 130.

Figure 8:
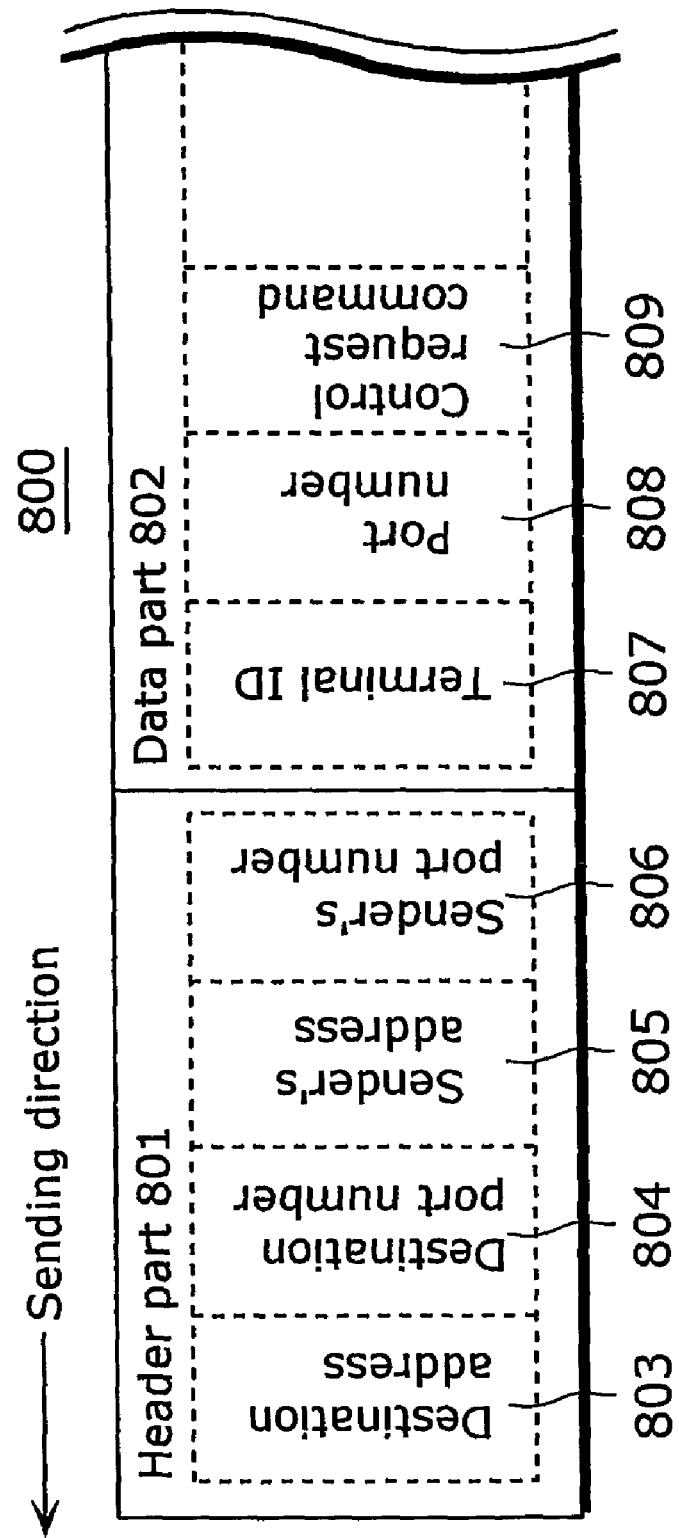
FIG. 8 is a diagram showing an example data structure of the response global packet generated by the server apparatus according to the first embodiment.

Subsequently, the control request processing unit 204 prepares the frame 2 which includes the control request command, the terminal ID and the port number unique to the internet terminal 110 to be controlled (S708), and the packet generation unit 206 generates a response global packet consisting of the header part that includes the destination and sender's addresses and port numbers, and of the data part that includes the frame 2. Note that FIG. 8 illustrates the data structure of such response global packet. Also note that information such as "turn the operating state of the air conditioner 103 to ON" is described in the control command.

The encryption processing unit 202 obtains the response global packet generated by the packet generation unit 206 and encrypts its data part, and the communication unit 201 sends the encrypted response global packet to the router 101 and terminates a series of processing (S709).

FIG. 8 is a diagram showing an example data structure of a response global packet 800 generated by the server apparatus 200 according to the first embodiment.

The frame 2, which is prepared by the control request processing unit 204, is contained in a data part 802, and includes: a terminal ID 807 of the Internet terminal 110 to be controlled; a port number 808 which includes the local port number 510 included in the data part 502 of the global packet;

and a control request command 809 that includes a control command requested from the mobile terminal device 130 to the internet terminal 110.

The frame 2 is passed to the packet generation unit 206 after being encrypted by the encryption processing unit 202, and then the response global packet 800 including the header part 801 and the data part 802 is generated.

The packet generation unit 206 passes such generated response global packet 800 to the communication unit 201, which then extracts, from the table 205a in the terminal information storage unit 205, the terminal ID of the Internet terminal 110 to be controlled, i.e. the terminal ID which matches the terminal ID 807 included in the frame 2, and obtains the terminal ID 807, a destination address 803, and a destination port number 804. Then, the communication unit 201 adds such obtained information to the header of the response global packet so as to generate such response global packet.

In the response global packet 800, the destination address 803 includes a terminal address which is the global address of the router 101, the destination port number 804 includes a terminal port number, a sender's address 805 includes the address of the server apparatus 200, and a sender's port number 806 includes a port number which the server apparatus 200 can use.

Next, an explanation is given of the procedure followed by the router 101 when receiving the response global packet form the server apparatus 200, converting it into a response local packet, and sending such response local packet to the internet terminal 110.

First, on the receipt of the response global packet from the server apparatus 200, the router 101 converts the destination address 803 included in the response global packet into the address of the internet terminal 110, and converts the destination port number 804 included in the response global packet into the port number of the internet terminal 110 with reference to the conversion table, and generates a response local packet. Then, the router 101 sends such generated response local packet to the internet terminal 110.

Note that the router 101 deletes a pair of the address and the port number of the internet terminal 110 and the address and the port number of the router 101 stored in the conversion table, when there was no local packet or response global packet received during a certain period of time. Meanwhile, when the above pair does not already exist in the conversion table of the router 101, the response global packet shall be destroyed.

Figure 9:
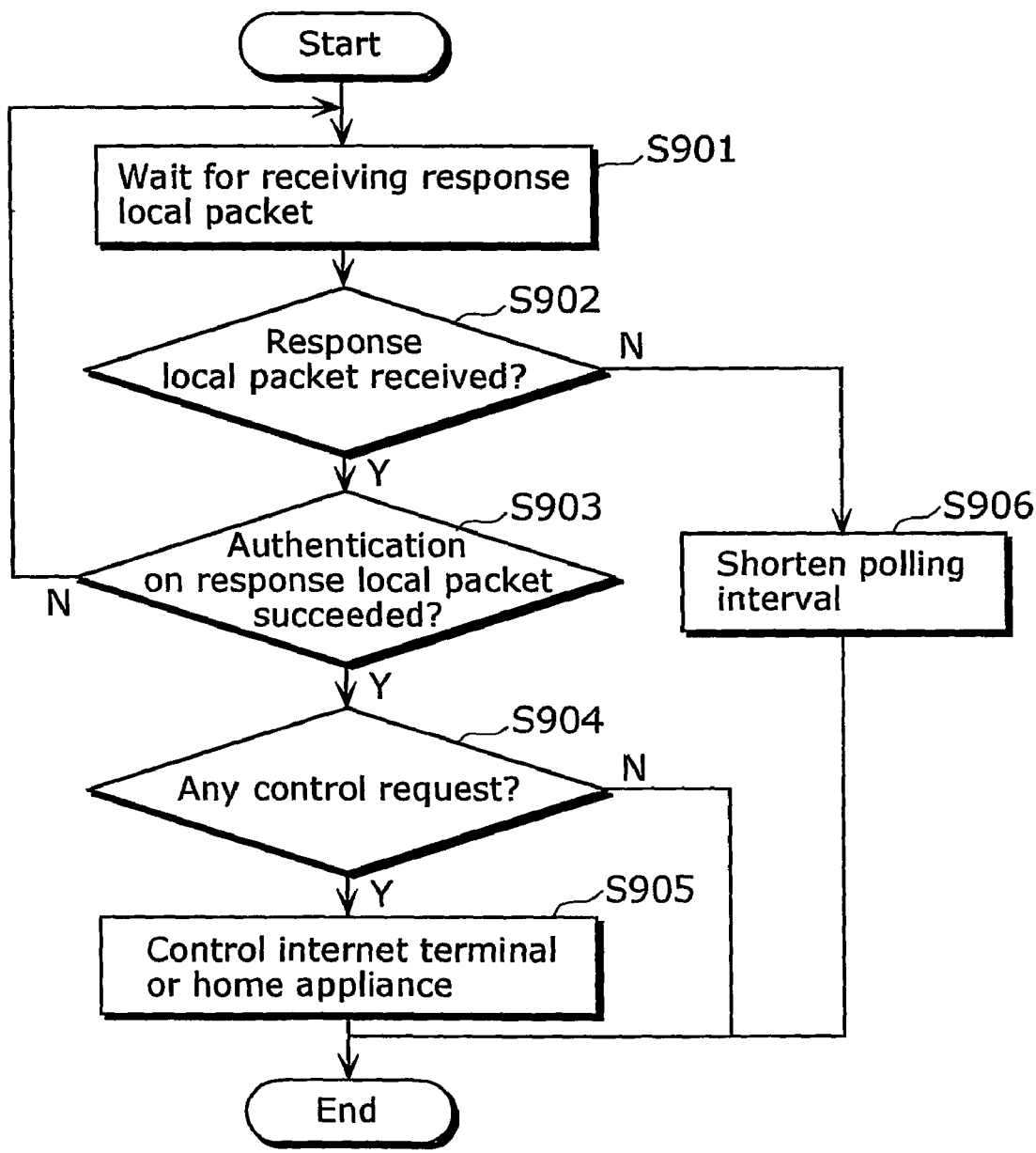
FIG. 9 is a flowchart showing a procedure followed by the internet terminal according to the first embodiment when receiving the response global packet.

FIG. 9 is a flowchart showing the procedure followed by the internet terminal 110 according to the first embodiment when receiving the response local packet.

The communication unit 111 waits for receiving a response local packet during the polling interval, after sending the local packet to the router 101 (S901).

When receiving the response local packet during the polling interval (Y in S902), the communication unit 111 passes such response local packet to the encryption processing unit 112. The encryption processing unit 112 decrypts the data part 802 of the response local packet, and passes the resultant to the control unit 116. The control unit 116 then performs authentication by making a judgment on whether the terminal ID 807 included in the data part 802 matches the terminal ID possessed by the internet terminal 110 and on whether the port number 808 matches the local port number 510 used when the frame 1 was generated (S903). When the authentication failed (N in S903), the communication unit 111 returns to the wait state for receiving the response local packet.

When the authentication succeeded (Y in S903), the control unit 116 obtains and reads out the control request command 809 included in the data part 802. And, when the contents of the control request command 809 indicates "no control request" (N in S904), the control unit 116 terminates the receiving process.

On the other hand, when the contents of the control request command 809 indicates "there is a control request" and it is intended for controlling the internet terminal 110 or the home appliance 103 and the like on connection (Y in S904), the control unit 116 controls the internet terminal 110 or the connected home appliance 103 and the like according to the contents of the control request command 809 (S905). An example of this control request is "start the air conditioner at seven."

Meanwhile, when the communication unit 111 did not receive the response local packet during the polling interval (N in S902), the polling interval adjustment unit 115 performs processing for shortening such polling interval (S906). For example, when the polling interval is set to 20 minutes as the default, such polling interval is made shorter minute by minute (e.g. 19 minutes, 18 minutes . . . ) until the response local packet is received. Assuming that the communication unit 111 receives the response local packet when the polling interval has been shortened to 10 minutes, the local packet is sent to the router 101 every 10 minutes from then on. Note that the polling interval may be shortened to 10 minutes or shorter, e.g. 9.5 minutes, in such a case Also note that, in the internet terminal 110 according to the first embodiment, the polling interval adjustment unit 115 may check the table holding period of the router 101 which is connected at the time of activation, instead of shortening the polling interval as described above.

Figure 10:
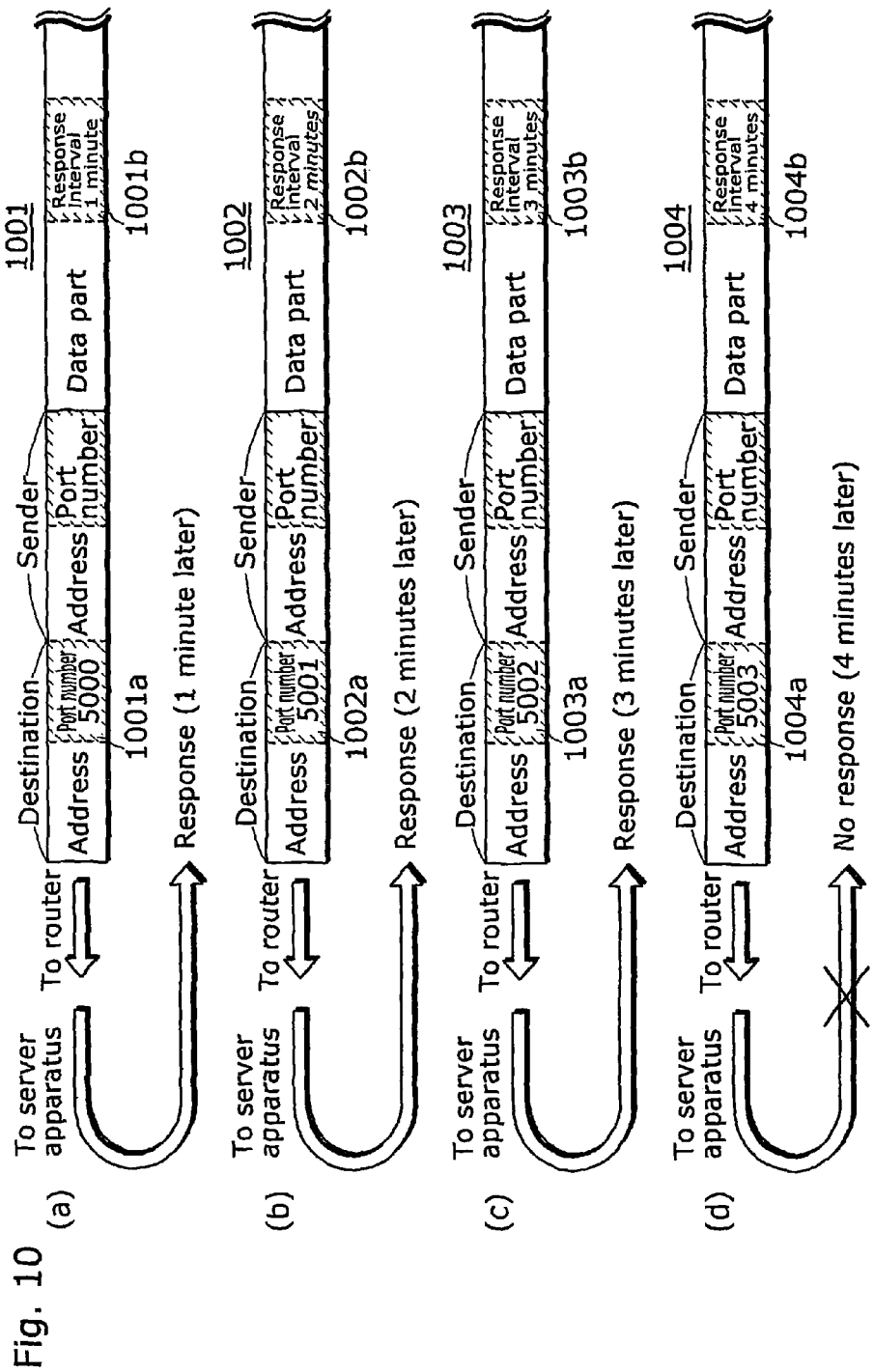
FIG. 10 is a diagram showing a data structure of the local packet data which is sent by the internet terminal in order to obtain a holding period during which the router holds a corresponding relationship between a local address and a global address, when the internet terminal is activated.

FIG. 10 is a diagram showing the data structure of the local packet data which is sent by the Internet terminal 110 in order to obtain the holding period during which the router 101 holds a corresponding relationship between a local address and the global address, when the internet terminal 110 is activated.

For example, the packet generation unit 113 of the internet terminal 110 generates four local packets, each having a different destination port number (e.g. 5000~5003) as its destination port number included in a header part, a different sender's port number, and a different polling interval (e.g. 1 minutes~4 minutes with a 1-minute time interval between each interval) as its response interval included in a data part. Then, the communication unit 111 sends such four local packets all at once to the server apparatus 200. Note that these time intervals and port numbers are just examples and therefore that the present invention is not limited to them.

Since the corresponding relationship between global and local addresses is usually cached for a certain period of time in the corresponding relationship table 600 possessed by the router 101, the corresponding relationship is stored for such certain period of time, but it is to be deleted after the certain period of time. Thus, response packet data beyond the holding period shall not be sent back.

Accordingly, the communication unit 111 of the internet terminal 110 performs the receiving process, but in a case where it has received response global packets corresponding to local packets 1001, 1002, and 1003, but it has not received a response global packet corresponding to a local packet 1004, the polling interval adjustment unit 115 judges that a corresponding relationship is cached for "3 minutes" in the router 101, and sets a polling interval of local packets to 3 minutes.

Figure 11:
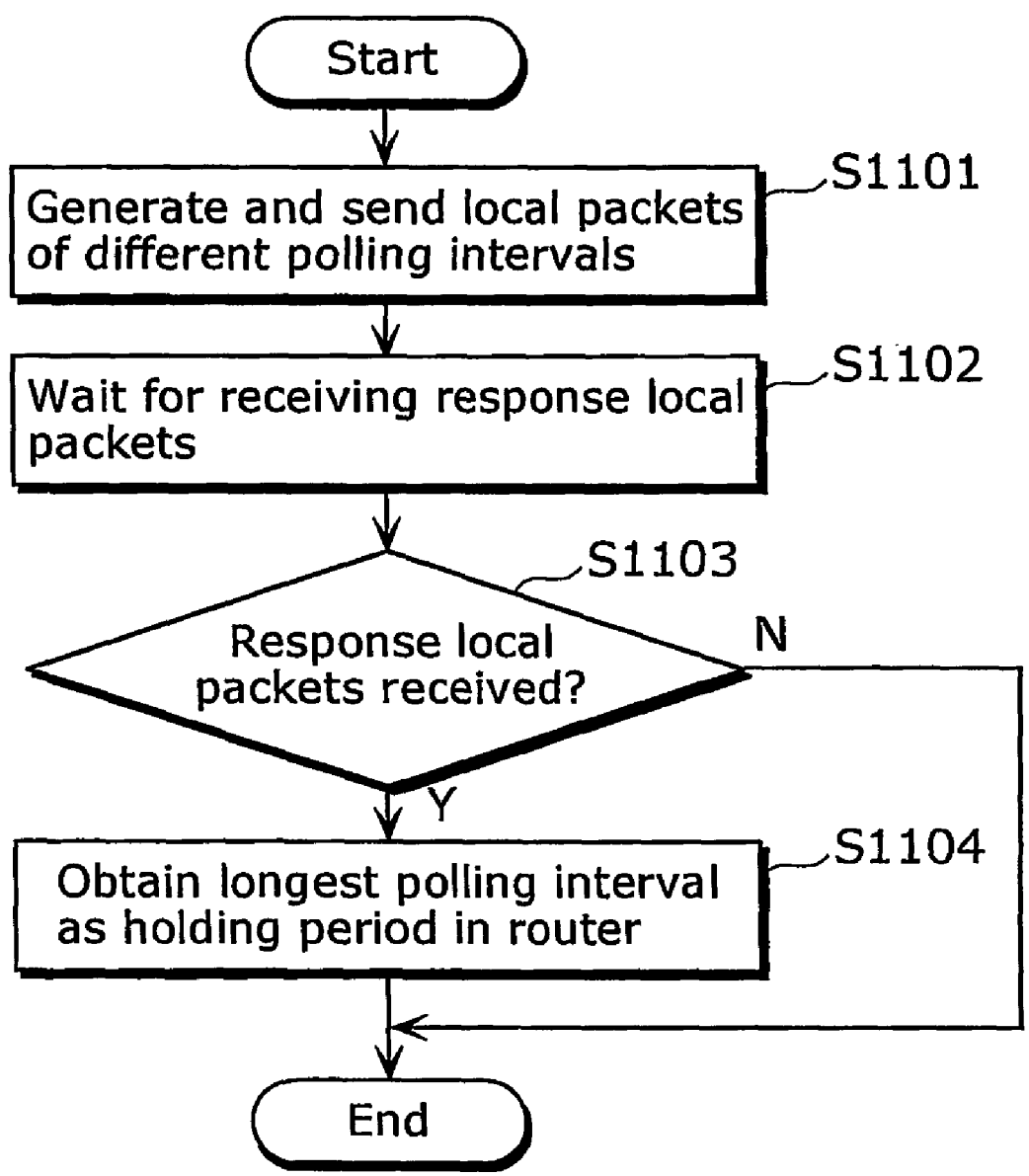
FIG. 11 is a flowchart showing a procedure followed by the internet terminal according to the first embodiment when obtaining the holing period during which the router holds a conversion table, so as to detect a polling interval at the time of activation.

FIG. 11 is a flowchart showing the procedure followed by the internet terminal 110 according to the first embodiment when obtaining the holing period during which the router 101 holds the conversion table, so as to detect a polling interval at the time of activation.

First, the packet generation unit 113 of the internet terminal 110 generates a plurality of local packets whose polling interval is different from each other's, the encryption processing unit 112 encrypts such generated local packets, and the communication unit 111 sends them to the router 101 (S1101).

Next, the communication unit 111 of the internet terminal 110 waits for response local packets (S1102), and judges whether response local packets have been received or not (S1103). When the response local packets have been received (Y in S1103), the polling interval adjustment unit 115 obtains, as a corresponding relationship holding period of the router 101, the last and longest polling interval which has been received (S1104).

Meanwhile, when the response local packets have not been received (N in S1103), the internet terminal 110 terminates this processing.

As described above, the internet terminal 110 according to the first embodiment is comprised of the polling interval adjustment unit 115 that detects the holding period during which the router 101 holds the conversion table and judges a polling interval at which local packets are sent out, and of the communication unit 111 that sends a local packet periodically and repeatedly to the router 101 according to such polling interval.

Accordingly, in an environment where the router 101 is connected to an internet network at all times, since the router 101 can always possess a corresponding relationship table that lists a relationship between global and local addresses and port numbers even in the polling method, the server apparatus 200 generates a global packet which includes the global address of the router 101 corresponding to its terminal ID and sends it to the router 101, and consequently the router 101 can convert the global address into a local address on the local network with reference to the conversion table which it stores, even when the user in an outside location sends a control request via the mobile terminal device 130. Accordingly, it is possible to remotely control the home appliance 103 and the like at home in a manner which satisfies the user's requirement by sending, in real time, control information sent by the user in an outside location using the mobile terminal device 130 to the target internet terminal 110 at home.

What is more, according to the present invention, since there is no need for making a setting for the router by using the polling for the router, it is possible for a user to remotely operate a home appliance from an outside location by connecting the internet terminal 110 according to the present invention to the existing router 101. Thus, the present invention is capable of making a dramatic improvement in the convenience of its user.

Regarding the server apparatus 200, since it needs to send a response global packet to a terminal apparatus at home to be controlled only when a user makes a control request from outside home using the mobile terminal device 130, it is not necessary for the internet terminal 110 to inquire the server apparatus 200 about the presence/absence of a control request, as is required in a conventional method.

Moreover, since the polling interval adjustment unit 115 of the internet terminal 110 detects, at the time of activation, the holding period during which the router 101 holds the conversion table, it is possible to avoid a situation in which a user cannot make a control request from an outside location because of the reason that the corresponding relationship stored by the router 101 disappeared, as seen in a conventional case.

Furthermore, since even an existing router can hold a relationship between destination and sender's addresses in a UDP packet for a certain period of time, there is no need for adding a new functionality to a router, meaning that the present invention can be embodied utilizing an existing router.

Also, it is possible for the server apparatus 200 to know the latest global address of the router 101 by checking the terminal ID of the internet terminal 110 to be controlled. Accordingly, even in a case where a different global address is assigned to the router 101 due to a temporary disconnection of an always-on connection, the user can send control information from the mobile terminal device 130 to the internet terminal 110 to be controlled without needing to carry out a special setting task.

Note that it is also conceivable that the result of controlling the internet terminal 110 and the home appliance 103 according to the first embodiment is sent to the user's mobile terminal device 130. Examples of such control result are "timer setting of the air conditioner from seven completed" and "hot-water supply completes at ten". The procedure of sending a control result is explained below.

The control unit 116 of the internet terminal 110 obtains the control request command 809 included in the data part 802 of the response local packet, and controls the internet terminal 110 accordingly. When a terminal to be controlled is the air conditioner 103, for example, the contents of the control request command 809 is sent to the appliance control unit 103b of the air conditioner 103.

The appliance control unit 103b of the home appliance 103 controls the home appliance 103 according to the control request, and sends data indicating the result of such control to the control unit 116 of the internet terminal 110.

The control unit 116 of the internet terminal 110 passes, to the encryption processing unit 112, a frame (to be referred to as "frame 3" hereinafter) to be sent to the server apparatus 200 by incorporating, into the frame 3, the data sent by the home appliance 103 indicating its control result or the control result of the internet terminal 110.

The encryption processing unit 112 encrypts the frame 3, and passes the resultant to the communication unit 111. The communication unit 111 generates a local packet to be sent to the server apparatus 200 in a manner equivalent to the one explained above, and sends it to the router 101. Thus, such local packet includes data indicating the control result.

The router 101 converts the local address described in the received local packet into a global address, stores them in the corresponding relationship table 600, and sends the global packet to the server apparatus 200 via the Internet network 120.

In the server apparatus 200, the communication unit 201 receives the global packet sent by the router 101 and passes it to the encryption processing unit 202, which then decrypts the frame 3 in the received global packet and passes the resultant to the control request processing unit 204. Then, the control request processing unit 204 reads in the data indicating the control result of the home appliance 103 or the data indicating the control result of the internet terminal 110, so as to obtain the control result, and the communication unit 201 sends such control result to the mobile terminal device 130 and a series of processing is terminated.

Note that the polling interval adjustment unit 115 shortens a polling interval at which a local packet is sent by the minute in the explanation of the present invention, but a polling interval does not necessarily have to be shortened by the minute, and therefore that it may vary depending on the implementation of the internet terminal 110.

Second Embodiment

Figure 12:
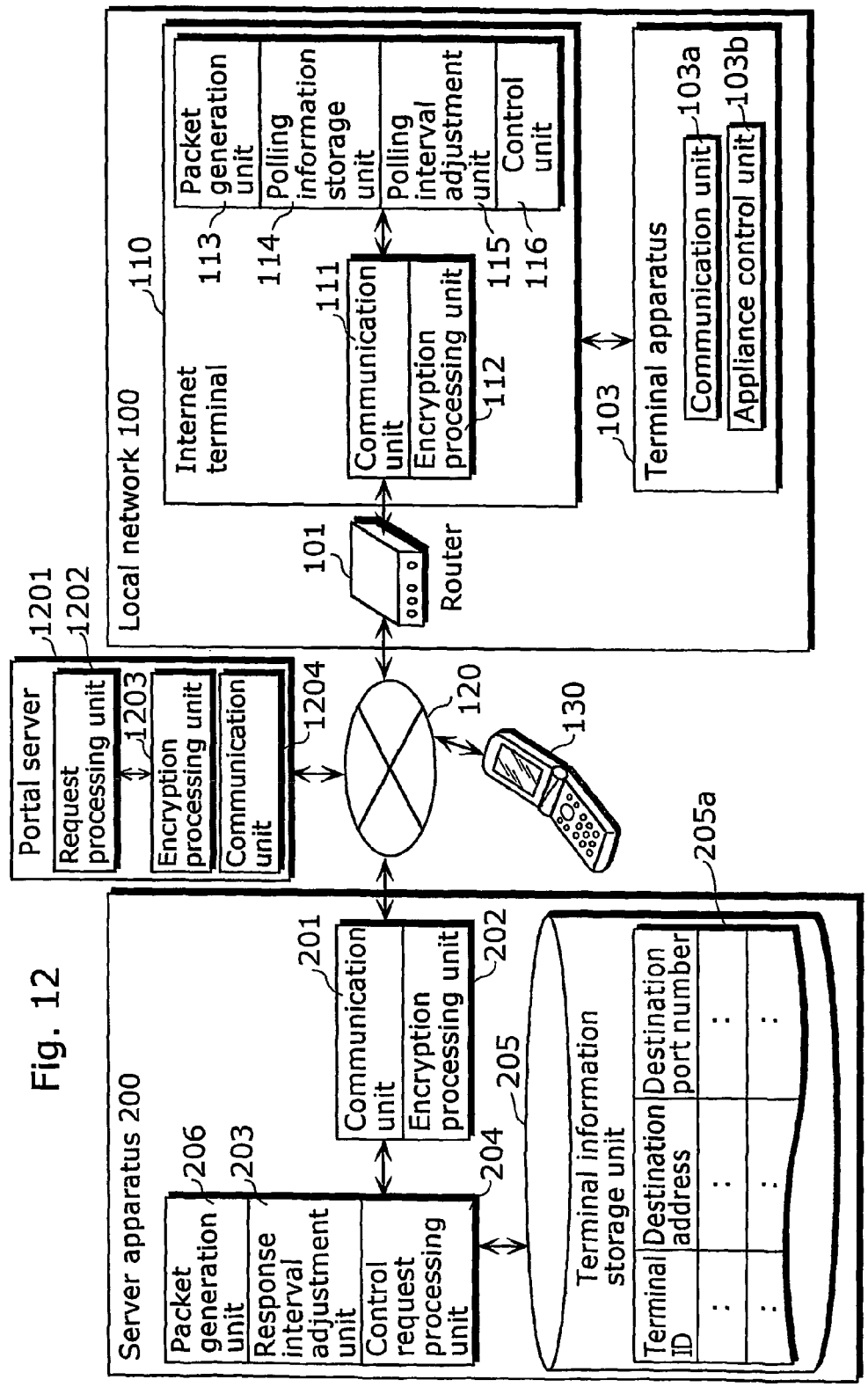
FIG. 12 is a functional block diagram showing a portal server, the server apparatus and the internet terminal according to the second embodiment.
Figure 13:
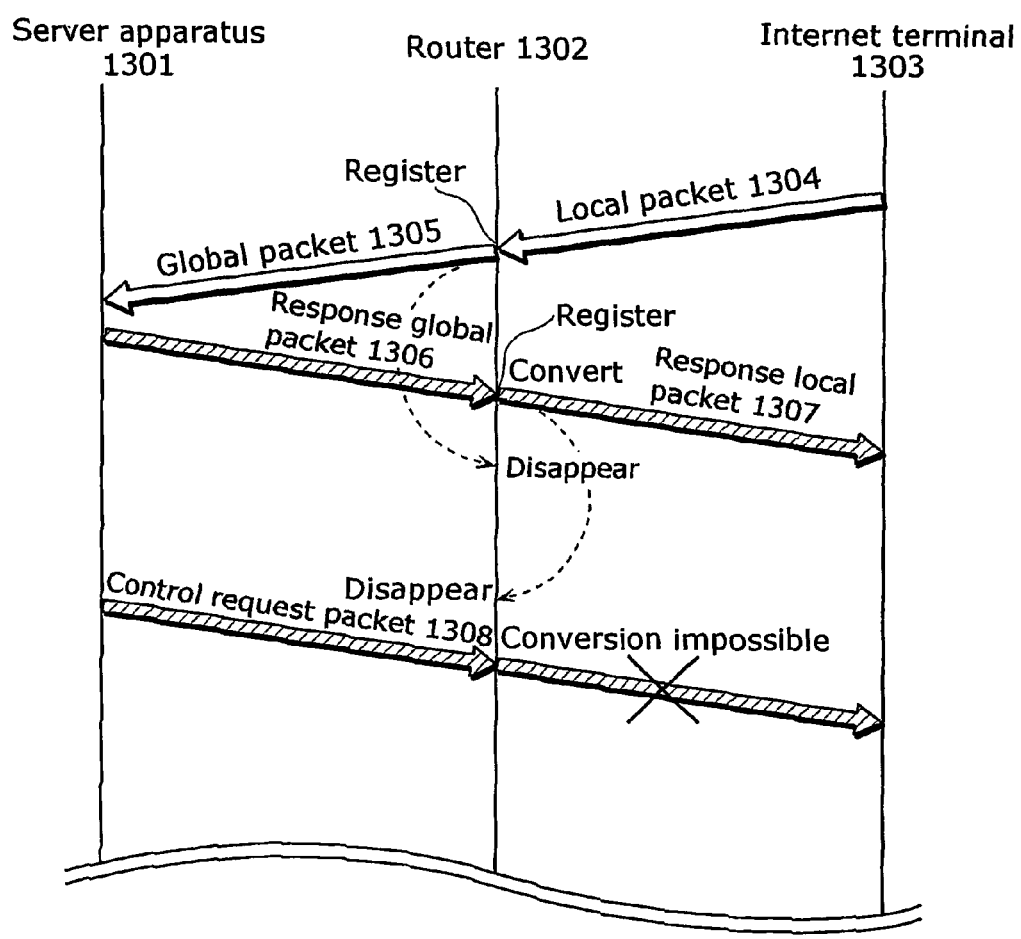
FIG. 13 is a sequence diagram showing a flow of packet data to be sent for controlling a terminal apparatus at home in accordance with the conventional polling method.

Referring to FIG. 12, an explanation is given of a second embodiment of the communication system according to the present invention.

FIG. 12 is a functional block diagram showing a portal server 1201, the server apparatus 200 and the Internet terminal 110 according to the second embodiment. In the communication system according to the second embodiment, the portal server 1201 is newly added to the configuration of the communication system according to the above-described first embodiment illustrated in FIG. 2. The second embodiment is characterized by that a control request from the user's mobile terminal device 130 is sent to this portal server 1201, and the home appliance 103 and the like connected to the internet terminal 110 is controlled by the portal server 1201 via the server apparatus 200. Note that, in FIG. 12, the same constituent elements as those illustrated in FIG. 2 are assigned with the same numbers, and detailed explanations thereof are omitted.

This portal server 1201 is a server which handles, for example, an application dedicated to remotely operating a home appliance at home from an outside location, and is comprised of a communication unit 1204 for sending and receiving packet data to and from the outside, an encryption processing unit 1203 for encrypting and decrypting packet data, and a request processing unit 1202. The request processing unit 1202 reads in a control request sent from a mobile terminal device.

Next, an explanation is given of the processing procedure of the communication system according to the second embodiment. First, the user sends, to the portal server 1201, a control request for controlling the Internet terminal 110 such as a home appliance having a terminal ID unique to the home network, via the internet network 120 by the use of the mobile terminal device 130. An example of the control request is "program the DVD-video recorder to record the news program at ten", as described above.

Then, the communication unit 1204 of the portal server 1201 receives the control request from the mobile terminal device 130, and sends such control request to the server apparatus 200 via the internet network 120.

Subsequently, the control request processing unit 204 of the server apparatus 200 generates the control request command 809 to be incorporated into the frame 2 according to the received control request, and further incorporates the address of the portal server 1201 into such control request command 809.

The subsequent processing is equivalent to that in the first embodiment: the control request processing unit 204 generates the frame 2 including the control request command 809 and the address of the portal server 1201, and passes it to the packet generation unit 206, and the packet generation unit 206 generates a response global packet that includes the header part, and passes it to the encryption processing unit 202. The encryption processing unit 202 encrypts the frame 2, which is then sent to the router 101 by the communication unit 201.

Then, the communication unit 111 of the internet terminal 110 receives the response local packet from the router 101, and the encryption processing unit 112 decrypts the data part 802 of such response local packet and passes the resultant to the control unit 116. The control unit 116 obtains the control request command 809 included in the data part 802 of the response local packet, and controls the internet terminal 110 or the home appliance 103 according to the contents of the control request command 809. Subsequently, the appliance control unit 103b of the home appliance 103 sends data indicating its control result to the internet terminal 110.

Next, the control unit 116 of the internet terminal 110 passes, to the packet generation unit 113, the data indicating the control result sent by the home appliance 103 or the data indicating the control result of the internet terminal 110, and then the packet generation unit 113 generates a response local packet consisting of the data part and the header part, and sends it to the encryption processing unit 112.

The encryption processing unit 112 encrypts the data part of such response local packet, and the communication unit 111 sends, to the router 101, a local packet to be sent to the portal server 1201.

The router 101 converts such received local packet into a global packet to be sent to the portal server 1201, and sends the global packet to the portal server 1201 via the internet network 120.

The communication unit 1204 of the portal server 1201 receives the global packet including the control result information routed by the router 101 and passes it to the encryption processing unit 1203, which then decrypts the data part in such global packet and passes it to the request processing unit 1202. Subsequently, the request processing unit 1202 obtains the data indicating the control result of either the home appliance 103 or the internet terminal 110 included in the data part and passes it to the communication unit 1204, and the communication unit 1204 sends the received control result of either the home appliance 103 or the internet terminal 110 to the mobile terminal device 130.

As explained above, since the communication system according to the second embodiment incorporates the portal server 1201, which uses a dedicated application for the internet terminal 110 for remotely operating home appliances, it is possible to employ the portal server 1201 as a dedicated server of the internet terminal 110.

Moreover, even in a case where an internet terminal for providing a different kind of services is to be provided, it is possible to use the same server apparatus 200 by appropriately using either the portal server 1201 or the server apparatus 200 that periodically receives a packet, depending on need.

Note that a mobile phone is used as the mobile terminal device 130 in explaining the preferred embodiments, but the present invention is not limited to this, and therefore that an equivalent functionality can be achieved by using another terminal device/apparatus including a PC and a PDA which can be connected to the Internet network 120.

The home terminal apparatus according to the present invention is suited to be used as a terminal apparatus for sending and receiving packet data to and from a router connected to an external network, by being connected to such router via a home network, and more particularly, the home terminal apparatus according to the present invention is applicable to a terminal apparatus for remotely operating home appliances in an integrated manner as well as applicable to home appliances and the like such as an air conditioner.

The invention claimed is:

1. A terminal apparatus for sending and receiving data to and from a router that is connected to an external network to which a server apparatus is connected, said terminal apparatus being connected to the router via a home network and the router holding a corresponding relationship between a global address assigned to the router and a local address of said terminal apparatus for a predetermined period of time, said terminal apparatus comprising:

a communication unit operable to send and receive data to and from the server apparatus via the router during a polling interval; and an adjustment unit operable to detect a holding period during which the corresponding relationship is held in the router, and to set a period shorter than the holding period as a sending interval at which the data is sent;

wherein said communication unit is operable to send the data repeatedly to the router according to the sending interval, and said adjustment unit is operable to detect a longest response interval as the holding period in the router out of a plurality of response data sent by the server apparatus in response to the plurality of data sent by said terminal apparatus; and the corresponding relationship between the global address and the local address is always maintained as long as the terminal apparatus sends data packets to the router at the polling interval shorter than the holding period.

2. The terminal apparatus according to claim 1, wherein:

a mobile terminal device sends a control request to said terminal apparatus; and said communication unit is operable to receive the control request via the router.

3. The terminal apparatus according to claim 2, further comprising:

a control unit operable to control said terminal apparatus according to the control request.

4. The terminal apparatus according to claim 2, wherein:

a plurality of apparatuses are connected to said terminal apparatus via the home network;

each apparatus of the plurality of apparatuses includes an apparatus control unit operable to control the apparatus itself;

said communication unit is operable to send the control request to each apparatus; and the apparatus control unit of each apparatus is operable to control the respective terminal apparatus according to the received control request.

5. The terminal apparatus according to claim 4, wherein said plurality of apparatuses are home appliances.

6. The terminal apparatus according to claim 1, further comprising:

a generation unit operable to generate data to be sent to the server apparatus;

wherein said generation unit is operable to generate the data that includes at least the following information in a header part: the local address of said terminal apparatus as a sender's address; a local port number of said terminal apparatus as a sender's port number; an address of the server apparatus as a destination address; and a port number of the server apparatus as a destination port number, and to generate the data that includes at least the following information in a data part: a unique terminal ID of said terminal apparatus.

7. The terminal apparatus according to claim 6, wherein:

a mobile terminal device sends a control request to said terminal apparatus; and said communication unit is operable to receive the control request via the router.

8. The terminal apparatus according to claim 7, further comprising:

a control unit operable to control said terminal apparatus according to the control request.

9. The terminal apparatus according to claim 7, wherein:

a plurality of apparatuses are connected to said terminal apparatus via the home network;

each apparatus of the plurality of apparatuses includes an apparatus control unit operable to control the apparatus itself;

said communication unit is operable to send the control request to each apparatus; and the apparatus control unit of each apparatus is operable to control the respective terminal apparatus according to the received control request.

10. The terminal apparatus according to claim 1, further comprising:

a generation unit operable to generate data to be sent to the server apparatus;

wherein said generation unit is operable to generate the data that includes at least the following information in a header part: the local address of said terminal apparatus as a sender's address; a local port number of said terminal apparatus as a sender's port number; an address of the server apparatus as a destination address; and a port number of the server apparatus as a destination port number, and to generate the data that includes at least the following information in a data part: a response interval at which response data is sent as a response from the server apparatus.

11. The terminal apparatus according to claim 10, wherein said adjustment unit is operable to adjust the sending interval to become shortened when said communication unit has not, received the response data from the router within the sending interval.

12. The terminal apparatus according to claim 10, wherein:

said generation unit is operable to generate a plurality of data with different response intervals;

said communication unit is operable to send the plurality of data generated by said generation unit; and said adjustment unit is operable to detect the holding period during which the corresponding relationship is held in the router from the response interval at which the response data is sent.

13. The terminal apparatus according to claim 10, wherein the server apparatus includes:

a second communication unit operable to send and receive the data;

a response interval adjustment unit operable to obtain the response interval at which the response data is sent to said terminal apparatus, the response interval being included in the data, and to determine a response period during which the response data should be sent; and a second generation unit operable to generate the response data to be sent to said terminal apparatus;

wherein said second communication unit is operable to send, to the router, the response data generated by said second generation unit according to the response period.

14. The terminal apparatus according to claim 1, wherein said terminal apparatus is a home terminal apparatus.

15. The terminal apparatus according to claim 1, wherein said terminal apparatus is an internet terminal.

16. A communication method for use with a terminal apparatus for sending and receiving data to and from a router that is connected to an external network to which a server apparatus is connected, the terminal apparatus being connected to the router via a network and the router holding a corresponding relationship between a global address assigned to the router and a local address of the terminal apparatus for a predetermined period of time, said communication method comprising:

sending and receiving data to and from the server apparatus via the router during a polling interval; and detecting a holding period during which the corresponding relationship is held in the router, and setting a period shorter than the holding period as a sending interval at which the data is sent;

wherein in said sending and receiving of the data, the data is sent repeatedly to the router according to the sending interval, and a longest response interval is detected as the holding period in the router out of a plurality of response data sent by the server apparatus in response to the plurality of data sent; and the corresponding relationship between the global address and the local address is always maintained as long as the terminal apparatus sends data packets to the router at the polling interval shorter than the holding period.

17. The communication method according to claim 16, further comprising:

generating data to be sent to the server apparatus;

wherein in said generating, the generated data includes at least the following information in a header part: the local address of the terminal apparatus as a sender's address; a local port number of the terminal apparatus as a sender's port number; an address of the server apparatus as a destination address; and a port number of the server apparatus as a destination port number, and the generated data includes at least the following information in a data part: a unique terminal ID of the terminal apparatus.

18. The communication method according to claim 16, further comprising:

generating data to be sent to the server apparatus;

wherein in said generating, the generated data includes at least the following information in a header part: the local address of the terminal apparatus as a sender's address; a local port number of the terminal apparatus as a sender's port number; an address of the server apparatus as a destination address; and a port number of the server apparatus as a destination port number, and the generated data includes at least the following information in a data part: a response interval at which response data is sent as a response from the server apparatus.

19. A computer executable program stored on a computer-readable non-transitory storage medium for use with a terminal apparatus for sending and receiving data to and from a router that is connected to an external network to which a server apparatus is connected, the terminal apparatus being connected to the router via a network, and the router holding a corresponding relationship between a global address assigned to the router and a local address of the terminal apparatus for a predetermined period of time, said computer executable program causing the terminal apparatus to perform steps comprising:

sending and receiving of data to and from the server apparatus via the router during a polling interval; and detecting a holding period during which the corresponding relationship is held in the router, and setting of a period shorter than the holding period as a sending interval at which the data is sent;

wherein in the sending and receiving of the data, the data is sent repeatedly to the router according to the sending interval, and a longest response interval is detected as the holding period in the router out of a plurality of response data sent by the server apparatus in response to the plurality of data sent; and the corresponding relationship between the global address and the local address is always maintained as long as the terminal apparatus sends data packets to the router at the polling interval shorter than the holding period.

20. The program according to claim 19, further comprising:

causing a generation of data to be sent to the server apparatus;

wherein in the generation of data, the generated data includes at least the following information in a header part: the local address of the terminal apparatus as a sender's address; a local port number of the terminal apparatus as a sender's port number; an address of the server apparatus as a destination address; and a port number of the server apparatus as a destination port number, and the generated data includes at least the following information in a data part: a unique terminal ID of the terminal apparatus.

21. The program according to claim 19, further comprising:

program code operable to cause causing a generation of data to be sent to the server apparatus;

wherein in the generation of data, the generated data includes at least the following information in a header part: the local address of the terminal apparatus as a sender's address; a local port number of the terminal apparatus as a sender's port number, an address of the server apparatus as a destination address; and a port number of the server apparatus as a destination port number, and the generated data includes at least the following information in a data part: a response interval at which response data is sent as a response from the server apparatus.

22. A communication system comprising:

a server apparatus connected to an external network;

a terminal apparatus connected to a network; and a router which connects the external network and the network;

wherein said router holds a corresponding relationship between a global address assigned to said router and a local address of said terminal apparatus for a predetermined period of time; and said terminal apparatus comprises:

a communication unit operable to send and receive data to and from said server apparatus via said router during a polling interval; and an adjustment unit operable to detect a holding period during which the corresponding relationship is held in said router, and to set a period shorter than the set period as a sending interval at which the data is sent;

wherein said communication unit is operable to send the data repeatedly to said router according to the sending interval, and said adjustment unit is operable to detect a longest response interval as the holding period in the router out of a plurality of response data sent by the server apparatus in response to the plurality of data sent by said terminal apparatus; and the corresponding relationship between the global address and the local address is always maintained as long as the terminal apparatus sends data packets to the router at the polling interval shorter than the holding period.

23. The communication system according to claim 22, wherein:

said terminal apparatus further includes a generation unit operable to generate data to be sent to said server apparatus;

said generation unit is operable to generate the data to include at least the following information in a header part: the local address of said terminal apparatus as a sender's address; a local port number of said terminal apparatus as a sender's port number; an address of said server apparatus as a destination address; and a port number of said server apparatus as a destination port number, and the data is generated to include at least the following information in a data part: a unique terminal ID of said terminal apparatus; and said server apparatus includes:

a second communication unit operable to receive the data that includes the terminal ID of said terminal apparatus;

a terminal information storage unit operable to store the following information as a set of terminal information: the terminal ID of said terminal apparatus; a global address of said router which is a sender's address; and a global port number of said router which is a sender's port number; and a packet generation unit operable to obtain, from said terminal information storage unit, the global address and the global port number which correspond to the terminal ID when a control request to control said terminal apparatus with the terminal ID occurs.

24. The communication system according to claim 22, wherein:

said terminal apparatus further includes a generation unit operable to generate data to be sent to said server apparatus;

said generation unit is operable to generate the data to include at least the following information in a header part: the local address of said terminal apparatus as a sender's address; a local port number of said terminal apparatus as a sender's port number; an address of said server apparatus as a destination address; and a port number of said server apparatus as a destination port number, and the data is generated to include at least the following information in a data part: a response interval at which response data is sent as a response from said server apparatus.

* * * * *

UNITED STATES PATENT AND TRADEMARK OFFICE
CERTIFICATE OF CORRECTION

PATENT NO. : 7,729,331 B2 Page 1 of 1
APPLICATION NO. : 10/523695
DATED : June 1, 2010
INVENTOR(S) : Kazuhiro Aizu et al.

It is certified that error appears in the above-identified patent and that said Letters Patent is hereby corrected as shown below:

In column 20, claim 11, line 27, "has not, received" should read --has not received--.

Signed and Sealed this

Fifth Day of October, 2010

David J. Kappos
*Director of the United States Patent and Trademark Office*